United States Patent Office 3,255,494
Patented June 14, 1966

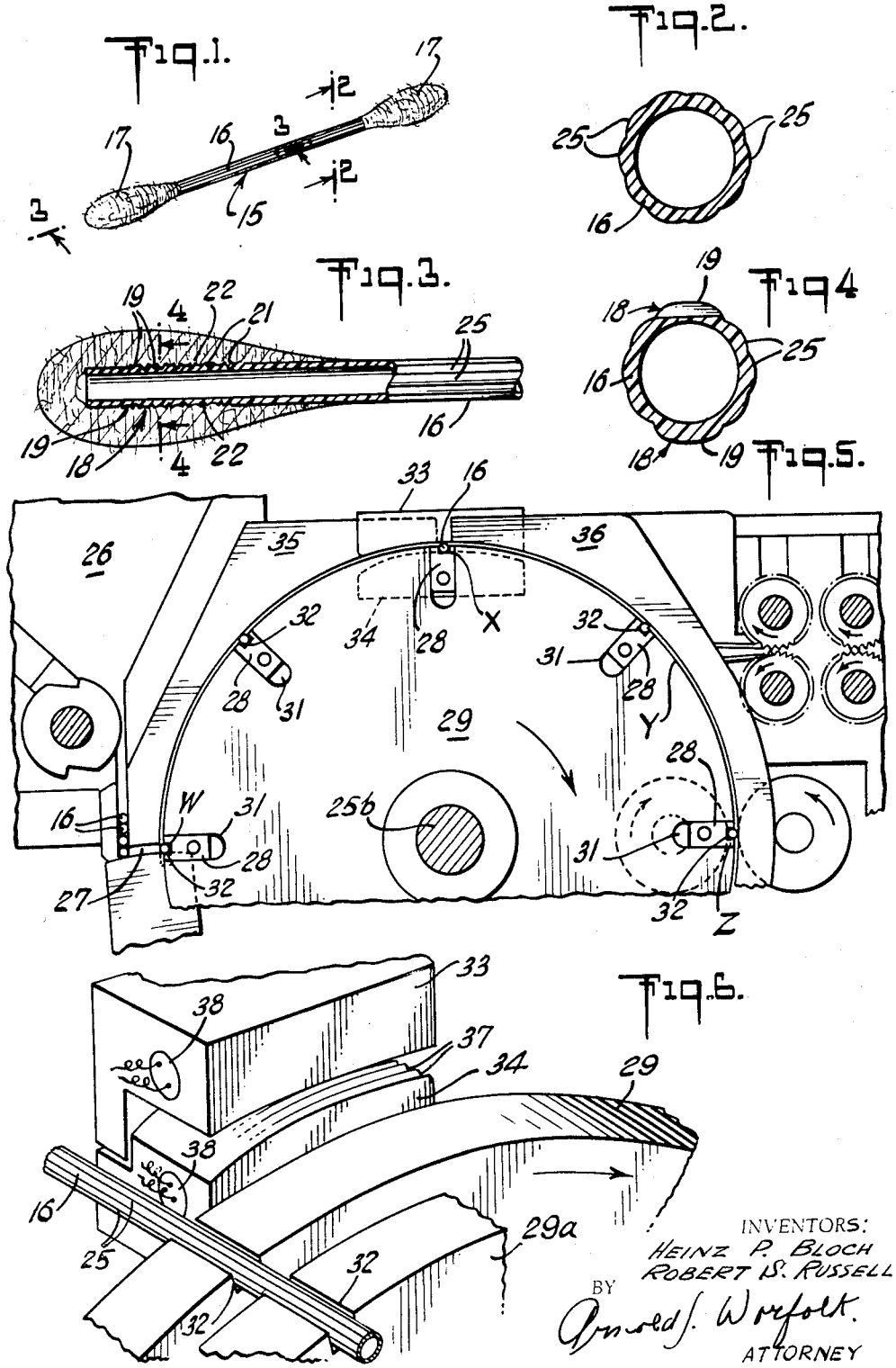

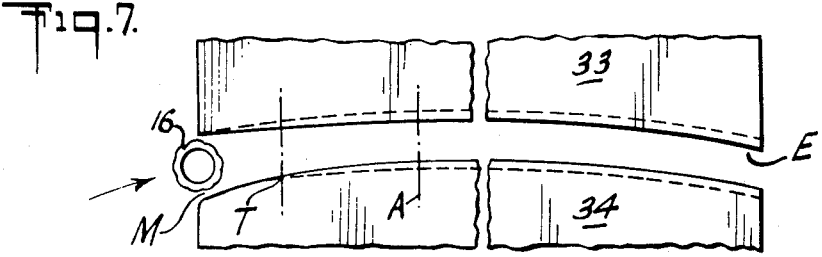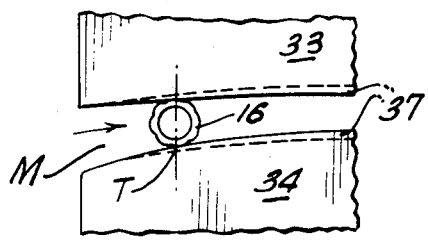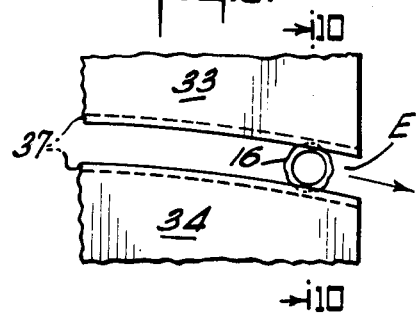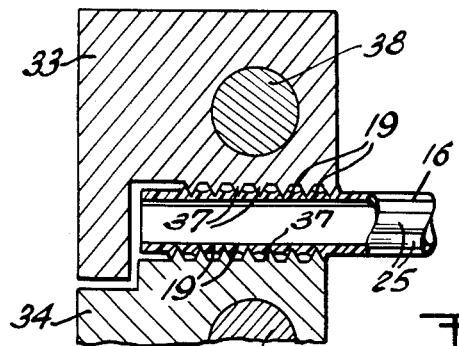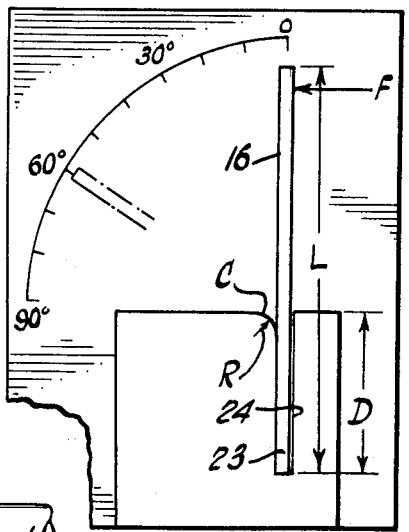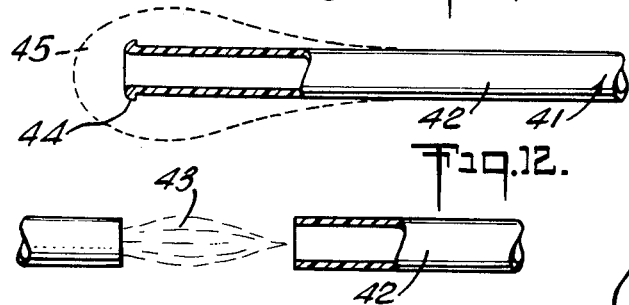

3,255,494
METHOD AND APPARATUS FOR MAKING APPLICATOR
Heinz P. Bloch, Irvington, and Robert S. Russell, South River, N.J., assignors to Johnson & Johnson, a corporation of New Jersey
Continuation of application Ser. No. 258,711, Feb. 15, 1963, now Patent No. 3,179,108, dated Apr. 20, 1965. This application July 20, 1964, Ser. No. 383,885
7 Claims. (Cl. 19—145.3)

The present invention relates to a method and machine for making absorbent swabs of the type which comprises a wad of absorbent material on one or both ends of a stick, and which commonly are used for cleaning aural and nasal passages and for cosmetic purposes and the like. This application is a continuation of copending application Serial No. 258,711, filed February 15, 1963 in the names of Heinz P. Bloch, and Robert S. Russell now Patent No. 3,179,108 issued April 20, 1965.

In the past, swabs of this type have been made by adhering a wad of absorbent fibrous material such as cotton to the end of a wooden or compressed paper stick by means of some kind of adhesive, and have presented several problems.

One problem has occurred because the absorbent wad, itself, sometimes slips off the stick or is displaced from the stick during use due to failure of the adhesive. For instance, a wad may stick in a body cavity and not come out when the stick is removed. This, of course, may cause serious difficulty and, in any case, creates lack of confidence regarding use of this type of swab.

Another problem has arisen because the wooden or paper stick, when sufficiently firm to allow it to be used under all conditions, may be too brittle and may snap when flexed, thereby creating an obvious danger.

While barbed wooden sticks have been proposed for preventing the wads from slipping off, this does not solve this problem because the very barb which may assist in holding the wad on the stick normally has a sharp point which protrudes outwardly into the wad and therefore is too dangerous for use in the ears, nose, and other body cavities. Of course, barbing the stick does not solve the problem of stick flexibility.

Molded solid plastic sticks having molded teeth or flanges on each end for holding the wads also have been proposed, but they too present more problems than they solve. For instance, they are too expensive and normally would not possess the desired flexibility. Furthermore, while the molded teeth or flanges proposed will tend to retain the wad, they are not adequate in themselves for assuring that the wad will not be displaced from the stick. Since adhesives for securing fibers to plastic sticks are not readily available, another problem is created. In addition the teeth or flanges, like the barbs on the wooden sticks, may be dangerous during use.

The absorbent swab of this invention solves all of these problems without using an adhesive and, at the same time, allows substantial savings due to a decrease in the cost of the stick and to the absence of the adhesive.

This invention contemplates a swab comprising a hollow thermoplastic stick and a wad of absorbent fibrous material firmly adhered to one end of the stick. The wad can not slip off the stick because some of its fibers are imbedded, or rooted, in a heat fused portion of the end of the stick, itself. Thus, the wad is "locked" on the stick without the need for any adhesive. The stick, itself, is firm without being brittle and is highly flexible and capable of being flexed in use under severe conditions without snapping. The stick walls are maintained thin to provide the desired flexibility and to minimize the cost of the material in the stick. At the same time, this necessitates the use of a fairly strong thermoplastic stick material. Polypropylene, high density polyethylene and vinyl polymers are examples of materials which are suitable for this purpose and not too expensive. Polypropylene is preferred because it can be sterilized by autoclaving at 240° F. for an extended period of time without deterioration and possesses ideal strength properties and flexibility when extruded into hollow tubing and cut into sticks according to this invention. The other materials mentioned are suitable for gas sterilization.

It is preferred, to provide a swab having the desired flexibility according to this invention, that the stick be capable of being flexed without snapping at least about 60 degrees about a curved surface having a three-sixteenth inch radius when a force is applied perpendicularly to the axis of the stick within about one quarter inch of one end of the stick and the other end of the stick is held straight and in a fixed position beyond said curved surface. It also is preferred that the stick be longitudinally grooved in such a way as to form a number of spaced longitudinal ridges which provide increased firmness for a given amount of stick material and a better gripping surface for holding the swab. It is believed that the longitudinal ridges provide a greater moment resisting flexure of the stick with resulting increased firmness.

According to this invention, an end portion of the hollow thermoplastic stick is heated instantaneously to a temperature in excess of the fusing temperature of the stick in such a way as to fuse this portion without destroying the structural integrity of the stick. When used in this application with reference to the application of heat, the word "instantaneously" means for a very short period of time such as a fraction of a second. It is considered that the "integrity" of the stick would be destroyed if it is permanently bent, distorted, seriously weakened, broken, or the like. A wad of fibrous material such as cotton is applied to or wound around the heat fused portion of the stick before it has fully solidified so that the fibers of the wad in contact with the stick become imbedded in the fused stick material, itself, and remain imbedded therein and adhered thereto after the stick cools and becomes fully solidified. Thus, it is practically impossible for the wad to slip off the end of the stick. However, to provide extra insurance against the wad being displaced from the end, one or more radially extending surfaces preferably are formed in the heat fused portion of the stick to provide direct mechanical engagement with the wad. For instance, a plurality of spaced transverse ridges may be formed on both the top and bottom of each end of the stick. Preferably, the radially extending surface or surfaces are formed in the stick during the application of heat thereto.

A preferred method of applying heat to the stick in the above-described manner, is to draw the end of the stick between heated jaws which are spaced to accommodate the stick and grooved to form spaced transverse ridges in the fused portion of the stick. The jaws are heated well above the fusing temperature of the stick and the sticks are in contact with the jaws for only a fraction of a second. By this method, heat is applied evenly to the top and bottom surfaces of the stick and the end of the stick is shaped quickly without twisting it or otherwise destroying its integrity.

Other and further advantages of the invention will be apparent from the following description and claims taken together with the drawings wherein:

FIG. 1 is a view in perspective of a swab according to one embodiment of this invention;

FIG. 2 is a greatly enlarged transverse sectional view taken along the line 2—2 of FIG. 1;

FIG. 3 is an enlarged longitudinal view partly in section and partly in elevation taken along the line 3—3 of FIG. 1;

FIG. 4 is a greatly enlarged sectional view taken along the line 4—4 of FIG. 3;

FIG. 5 is a schematic view, partly in section and partly in elevation, of apparatus for producing the swab of the preceding figures;

FIG. 6 is an enlarged schematic view in perspective of a portion of the apparatus of FIG. 5 showing one set of heating jaws for heating and shaping one end of the sticks as they pass through the apparatus;

FIG. 7 is an enlarged schematic view in elevation showing one of the sticks about to enter the space between one set of heating jaws;

FIG. 8 is a similar enlarged schematic view in elevation showing one of the sticks further along in its passage through the jaws;

FIG. 9 is another enlarged schematic view in elevation of the heating jaws, this time showing one of the sticks just before it leaves the jaws;

FIG. 10 is an enlarged view partly in section and partly in elevation taken along the line 10—10 of FIG. 9;

FIG 11 is an enlarged view partly in section and partly in elevation of a swab according to a somewhat different embodiment of this invention;

FIG. 12 is an enlarged schematic view partly in section and partly in elevation showing the heating of one end of the stick according to the embodiment of FIG. 11;

FIG. 13 is a plan view of a test fixture for measuring the flexibility of the plastic sticks of this invention.

Referring to FIGS. 1–10, there is shown an absorbent swab 15 according to a preferred embodiment of this invention. The swab comprises a thin walled hollow thermoplastic stick 16 and a wad 17 of absorbent fibrous material secured to each end of the stick. The stick has a heat fused portion 18 at each end and the wads 17 cover the heat fused portions and extend beyond each end of the stick. As will be explained more fully hereinafter, surface portions 18 of the length of the stick near each end of the stick are fused by applying heat instantaneously thereto and a multiplicity of transversely extending ridges 19 are formed in the stick. The absorbent fibrous material is adhered to the stick by wrapping it around the fused portions 18 of the stick in such a way that it comes into contact with the fused material thereof and with the ridges 19 before the fused material fully solidifies. The side surfaces 21 of the ridges 19 extend more or less radially with respect to the axis of the stick on opposite sides of the stick to define grooves 22 between adjacent ridges 19 and the absorbent fibrous material enters the grooves. As a result, the fibers of the wad 17 in contact with the heat fused portion 18 of the stick are imbedded therein, and the wad itself is in mechanical engagement with the side surfaces 21 of the ridges 19, thereby securing the wad to the stick.

The stick 15 and the swab, itself, are structurally firm, i.e., they possess appreciable columnar strength, but they also are capable of being flexed easily without snapping under normal use conditions. Under normal use conditions, the stress tending to flex the stick may vary from mild to severe. The stick of this invention is highly flexible and capable of being flexed in use under severe conditions without snapping. More specifically, referring to FIG. 13, the stick 16 is capable of being flexed without snapping a substantial angle such as at least about 60° about a curved surface C having a 3/16 inch radius R when a force F is applied perpendicularly to the axis of the stick within about one quarter inch of one end of the stick and the other end of the stick is held straight and in a fixed position beyond said curved surface. FIG. 13 illustrates a test fixture for measuring the flexibility of the stick in this manner. One end 23 of the stick is positioned in an elongated groove or hole 24 large enough to accommodate the stick diameter in such a way that the end of the stick reaches the end of the groove. The groove 24 is 1¼ inches long for a 3⅛ inch stick so that D in FIG. 13 equals 1¼ inches when L equals 3⅛ inches. As indicated above, the radius R of the curved surface C about which the stick is flexed is 3/16 inch. The degree of deflection of the stick about the surface C is measured as indicated in FIG. 13. This test is believed to establish a fair criterion for stick flexibility for purposes of this invention.

As indicated hereinbefore, one of the main advantages of this invention is that it makes possible cost savings because no adhesive is used and because a plastic stick may be utilized which is cheaper than the wooden and paper sticks previously used. This, in turn, is only possible if the plastic is in the form of a relatively thin walled hollow tubing. From a cost point of view, it is desirable to reduce the amount of plastic in the stick as much as possible and therefore to minimize the wall thickness of the tubing provided that this can be done without sacrificing the functional advantages of this type of stick. FIG. 2 shows a preferred cross-sectional stick shape according to this invention having a number of convex peripheral scallops, representing protruding longitudinal ridges 25 formed in the outside surface of the stick during extrusion. The ridges 25 have longitudinal grooves between them so that the hollow sticks 16 comprise alternating thick and thin wall portions represented by the ridges and grooves, respectively. This cross-sectional shape provides maximum firmness and flexural strength with a minimum of material since the increased thickness ridges 25 of the stick increase the moment resisting flexure. Furthermore, sticks possessing the particular scalloped cross-section of FIG. 2 will not interlock with one another and jam the apparatus when fed from a supply in the hopper.

An absorbent swab according to FIGS. 1–4 and having all of the advantages of this invention may be produced advantageously from polypropylene sticks extruded with a cross-section similar to that of FIG. 2 and wherein stick length is approximately 3⅛ inches, stick inside diameter is about 0.083 inch and mean wall thickness is about 0.015 inch. Preferably the absorbent fibrous material is wrapped around each end of the stick to form wads approximately ¾ inch long overlapping the ends of the stick by at least about 1/32 of an inch, normally slightly less than about ⅛ of an inch. Polypropylene is preferred for the stick, not only because it provides the desired firmness and flexibility in the desired stick shape, but also because it allows the swab to be sterilized by autoclaving as mentioned above. It is also highly desirable from a cost point of view. However, stick materials such as high density polyethylene, certain vinyl resins and other suitable thermoplastics may be used when the stick is to be sterilized by means other than autoclaving. Normally, the swab itself is formed from long staple cotton or rayon, but conceivably some other absorbent fibrous material may be used satisfactorily in accordance with this invention.

FIGS. 5–10 illustrate the manufacture of swabs according to the embodiment of the preceding figures. A supply of extruded sticks 16 having the cross-section of FIG. 2 are fed from a hopper 26 through a horizontal passageway 27 to a pickup position W where they are received intermitttently by conveyor fittings 28 spaced about the periphery of twin carrier wheels 29 and 29a which move the sticks from one position to another. The carrier wheels 29 and 29a are spaced from one another somewhat, as shown in FIG. 6, but rotate at the same speed about the same shaft 29b from position to position, as if they were one. The wheels are indexed so that they pause approximately 0.08, or about one twelfth, of a second at the end of each 45° of rotation. In FIG. 5 the wheel 29a is shown removed for the sake of clarity and the operation of the apparatus will be described only in connection with the wheel 29 and its associated parts for applying one of the cotton wads. The other wad is applied in an identical fashion from identical apparatus associated with the wheel 29a. The conveyor fittings 28 are bolted in axial grooves 31 spaced about the periphery of the carrier wheel 29 for this purpose. Each of the fittings 28 defines a small groove 32 shaped to receive one stick 16 and hold it as the wheel 29 rotates. Two pairs of heated jaws 33 and 34 are positioned at a heat fusing station X in the path of the sticks 16 at the top of the carrier wheel 29. Each pair of jaws 33 and 34 is located in the path of one end of the sticks in a manner most clearly shown in FIGS. 6 and 10. After the sticks 16 leave the heated jaws 33 and 34 they move downwardly through a wad feeding station Y where each end of the stick strikes a wad of absorbent material, not shown, placed in its path and carries the wad to a wad forming station Z approximately 180° opposite the stick feeding station W. First and second guide shoes 35 and 36 are positioned between the hopper 26 and the heated jaws 33 and 34 on one side of the carrier wheel and between the heated jaws and the wad forming station Z on the other side of the carrier wheel, respectively, to retain the sticks in the conveyor fittings 28 as they pass from station to station.

Referring particularly to FIG. 10, it will be seen that each pair of heating jaws 33 and 34 presents a row of spaced teeth 37 where the jaws come into contact with each end of the stick 16 as it passes through the jaws. The tips of the teeth 37 on the top jaw 33 are spaced from the tips of the teeth on the bottom jaw 34 by a distance slightly less than the outside dimension, or outside diameter, of the stick 16 so that the teeth 37 cut into the stick as the stick is drawn through the jaws. FIG. 10 is a transverse sectional view through the jaws showing these teeth adjacent the exit end E of the jaws. The teeth 37 are at their maximum height, i.e., that shown in FIG. 10 between the point A in FIG. 7 and the exit end E of the jaws. However, they are tappered from the point A to the entrance end, or mouth M, of the jaws, so that the teeth completely disappear at the mouth of the jaws. Thus, the spacing between the jaws 33 and 34 at their mouth M is slightly greater than the outside dimension of the sticks 16 so that the sticks easily enter the mouth of the jaws and come into contact with the tapered tips of the teeth 37 approximately at the position T shown in FIGS. 7 and 8. The jaws 33 and 34 and the teeth 37, themselves, are heated by electric cartridges 38 to a temerature well in excess of the fusing temperature of the sticks 16, i.e., approximately 800–900° F. when polypropylene sticks having a fusing temperature in the neighborhood of approximately 350° F. are used. Thus, contact between the hot teeth 37 of the jaws 33 and 34 and the sticks 16 begins at the point T and ends at the point E in the travel of the sticks through the jaws. The heated teeth cut into the top and bottom of the stick between the points T and A during which they reach their maximum height (or depth) and then remain in contact with the heated and grooved portions of the end of the stick until the point E is reached. The sticks are moved very rapidly through the jaws so that the application of heat is instantaneous, i.e., of extremely short duration. For instance, for a polypropylene stick of the size and type described, the time taken by the stick in traveling between the points T and E in the jaws 33 and 34 advantageously is about ⅙ of a second. This includes the indexed pause of about 1/12 of a second in the rotation of the wheels 29 and 29a.

The jaws 33 and 34 may be set so that the distance between the tips of opposite teeth 37 on the top and bottom jaws between the points A and E is just slightly greater than the inside diameter of the sticks 16 and adjusted so that the teeth do not quite cut through the sticks. It is desirable that the sticks do not rotate but remain in a substantially fixed angular position if they are grooved in this manner to assure that the ends of the sticks are not twisted off and that the structural integrity of the stick is maintained.

Some of the material displaced from the stick 16 in the formation of the ridges 19 moves outwardly to increase the outside dimension of the stick somewhat across the tips of the ridges, as shown schematically in FIG. 4. However, it is believed that a large percentage of the material displaced leaves the stick in the form of gases during the combined heating and shaping action of the jaws 33 and 34. As indicated hereinbefore, since the absorbent fibrous material is wrapped around the ends of the sticks while they are still hot and before they have had the opportunity to fully solidify, the fibers of the material in contact with the stick, not only enter the grooves 22 between the ridges 19 but tend to force their way into the fused stick material so that they are firmly imbeded therein after the material cools.

Referring to FIGS. 11 and 12, there is shown an absorbent swab 41 according to a somewhat different embodiment of the invention wherein the end of a similar hollow thermoplastic stick 42 is heated by a flame 43 directed axially toward the end of the stick to fuse a portion thereof. The stick end is exposed only instantaneously to the flame so that its structural integrity is not destroyed. When the flame is directed at the end of the stick for a very short period of time as shown and described, a flange 44 is formed on the end of the stick somewhat as illustrated in FIG. 11. Then the stick, with its flanged end still in partially fused condition, is wound with absorbent fibrous material, as described in connection with the embodiment of the preceding figures, to form a wad 45 suitable for a swab according to this invention. In this embodiment, fibers of the wad in contact with the heat fused portion of the stick are imbeded therein, and the wad is secured to the stick by imbedment of these fibers and by mechanical engagemnt between the wad 45 and the flange 44 at the end of the stick.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. The process of manufacturing an absorbent swab from a structurally firm hollow thermoplastic stick which comprises instantaneously heating a portion of one end of the stick by drawing it between heated jaws spaced from one another by a distance slightly less than the outside dimension of the stick, the surfaces of the jaws contacting the stick being heated to a temperature in excess of the fusing temperature of the stick in such a way as to fuse said portion without destroying the structural integrity of the stick, applying a wad of cellulosic fibrous material around said heat fused portion before it has fully solidified, and then allowing the stick to cool and fully solidify whereby the fibers of the wad in contact with said heat fused portion become imbedded in the stick.

2. The process of manufacturing an absorbent swab according to claim 1, wherein the jaws define spaced teeth which also are heated, and spaced transverse ridges are formed by the teeth in the heated portion of the stick which contacts the teeth.

3. Apparatus for making a swab with fusible stick and end tipped with fibrous material comprising, in combination, a rotatable stick carrier having devices for carrying a stick with fusible end through a heating station to a fibrous material applying station and means at the heating station for heating the stick at an end thereof as it passes through the station and bringing it to a fused condition.

4. Apparatus for making a swab with fusible stick and end tipped with fibrous material comprising, in combination, a rotatable stick carrier having devices for carrying a stick with fusible end through a heating station to a fibrous material applying station and means at the heating station for heating the stick at an end thereof to a fused condition and for upsetting said material while fused to present fibrous tip retaining means at the end of said stick.

5. Apparatus for making a swab with fusible stick and end tipped with fibrous material comprising, in combination, a rotatable stick carrier having devices for carrying a stick with fusible end through a heating station to a fibrous material applying station and means at the heating station including a pair of spaced heating jaws for heating the stick at an end thereof to a fused condition, said jaws presenting forming devices for impressing fibrous material retaining means near said end of the stick.

6. Apparatus according to claim 5 wherein said spaced heating jaws present a passageway with opposed teeth between which said stick passes, said teeth having their opposed edges spaced a distance less than the outside dimension of the stick.

7. Apparatus according to claim 5 wherein said spaced heating jaws present a passageway slightly wider at the mouth than the outside dimension of the stick and equipped with teeth with opposed edges toward the exit end of the passageway spaced a distance less than the outside dimension of the stick.

References Cited by the Examiner
UNITED STATES PATENTS

| | | | |
|---|---|---|---|
| 1,589,848 | 6/1926 | Harrison | 156—298 X |
| 2,228,599 | 1/1941 | Glickston | 19—145.3 |
| 2,294,480 | 9/1942 | Rohwederetol | 156—306 |
| 2,490,168 | 12/1949 | Strauss | 128—269 |
| 2,664,316 | 12/1953 | Winslow et al. | 15—143 |
| 2,678,665 | 5/1954 | Dieffenback et al. | 156—306 X |
| 2,705,009 | 3/1955 | Plantinga et al. | 128—269 |

EARL M. BERGERT, *Primary Examiner.*

C. B. COSBY, *Assistant Examiner.*